(12) United States Patent
Hong et al.

(10) Patent No.: US 9,779,878 B2
(45) Date of Patent: Oct. 3, 2017

(54) MAGNETIC SUPERCAPACITORS

(71) Applicant: THE BOARD OF TRUSTEES OF THE UNIVERSITY OF ALABAMA FOR AND ON BEHALF OF THE UNIVERSITY OF ALABAMA, Tuscaloosa, AL (US)

(72) Inventors: Yang-Ki Hong, Tuscaloosa, AL (US); Jae-Jin Lee, Tuscaloosa, AL (US)

(73) Assignee: The Board of Trustees of the University of Alabama for and on behalf of the University of Alabama, Tuscaloosa, AL (US)

( * ) Notice: Subject to any disclaimer, the term of this patent is extended or adjusted under 35 U.S.C. 154(b) by 118 days.

(21) Appl. No.: 14/403,515

(22) PCT Filed: May 24, 2013

(86) PCT No.: PCT/US2013/042705
§ 371 (c)(1),
(2) Date: Nov. 24, 2014

(87) PCT Pub. No.: WO2013/177543
PCT Pub. Date: Nov. 28, 2013

(65) Prior Publication Data
US 2015/0179345 A1 Jun. 25, 2015

Related U.S. Application Data

(60) Provisional application No. 61/651,446, filed on May 24, 2012.

(51) Int. Cl.
*H01G 7/00* (2006.01)
*H01G 4/30* (2006.01)
(Continued)

(52) U.S. Cl.
CPC ............... *H01G 7/06* (2013.01); *H01G 4/008* (2013.01); *H01G 7/00* (2013.01); *Y02T 10/7022* (2013.01)

(58) Field of Classification Search
CPC ...... H01G 4/30; H01G 4/1209; H01G 4/1218; H01G 4/1227; H01G 4/005
(Continued)

(56) References Cited

U.S. PATENT DOCUMENTS 4,312,025 A 1/1982 Boyer
6,737,930 B2 5/2004 Toncich
(Continued)

FOREIGN PATENT DOCUMENTS

DE 10 2008 013 513 9/2009
WO 2011/155078 12/2011

OTHER PUBLICATIONS

Zhang, et al. Sm(Co, Cu)5/Fe exchange spring multilayer films with high energy product. Applied Physics Letters 86, 122509 (2005).
(Continued)

*Primary Examiner* — Eric Thomas
(74) *Attorney, Agent, or Firm* — Maynard Cooper & Gale, P.C.; Jon E. Holland

(57) ABSTRACT

A magnetic supercapacitor has a dielectric layer positioned between magnetic layers. The magnetic layers may comprise hard, soft magnetic material or magnetic exchange coupled magnet (i.e. soft and hard magnet composite). A magnetic flux generated by the magnetic layers increases the permittivity of the dielectric layer, thereby increasing the capacitance and, hence, stored energy of the supercapacitor. When the magnetic layers comprise soft magnetic material, the capacitance of the supercapacitor can be varied. In this regard, current passing through a conductive segment within
(Continued)

close proximity to the magnetic layers may be controlled in order to tune the capacitance as may be desired.

16 Claims, 9 Drawing Sheets

(51) Int. Cl.
*H01G 7/06* (2006.01)
*H01G 4/008* (2006.01)

(58) Field of Classification Search
USPC .................. 361/303, 305, 311, 301.4, 277
See application file for complete search history.

(56) References Cited

U.S. PATENT DOCUMENTS

| | | | | |
|---|---|---|---|---|
| 7,821,771 B2* | 10/2010 | Lai | ........................ | H01G 7/00 361/502 |
| 2009/0141423 A1* | 6/2009 | Lai | ........................ | H01G 4/005 361/303 |
| 2009/0257168 A1 | 10/2009 | Lai | | |
| 2010/0142116 A1 | 6/2010 | Kim et al. | | |
| 2010/0214718 A1 | 8/2010 | Yeh | | |
| 2010/0302703 A1 | 12/2010 | Hwang | | |
| 2011/0051313 A1 | 3/2011 | Hwang | | |
| 2012/0099240 A1 | 4/2012 | Chang | | |

OTHER PUBLICATIONS

McCarthy, et al. Magnetocapacitance: A probe of spin-dependent potentials. Department of Physics, University of Florida. Feb. 1, 2008.

Copenheaver, International Search Report & Written Opinion of the International Searching Authority/US for International Application No. PCT/US2013/042705, Oct. 2, 2013.

* cited by examiner

| ε' (x 10⁴) | H = 0 Oe | H = 1 kOe | H = 2 kOe | H = 3 kOe | H = 4 kOe | Δε/ε |
|---|---|---|---|---|---|---|
| 8 MHZ | 1.27 | 1.45 | 1.54 | 1.57 | 1.65 | 30% |
| 10 MHZ | 0.88 | 1.06 | 1.15 | 1.17 | 1.22 | 38% |

MAGNETIC SUPERCAPACITORS

CROSS REFERENCE TO RELATED APPLICATION

This is the national stage application of and claims priority to International Application No. PCT/US2013/042705, entitled "Magnetic Supercapacitors" and having an international filing date of May 24, 2013, which is incorporated herein by reference. International Application No. PCT/US2013/042705 claims priority to U.S. Provisional Patent Application No. 61/651,446, entitled "Magnetic Supercapacitors" and filed on May 24, 2012, which is incorporated herein by reference.

RELATED ART

Efficient power and energy-storing components are important for various electric machines and electric vehicles. Machine operation needs electric power, which is usually stored in and extracted from batteries or fuels. In general, the batteries and fuels have high-energy density. However, they show poor dynamic performance and low power density as compared to a capacitor. Alternatively, supercapacitors have been used for high-voltage applications, such as electric vehicles. A supercapacitor provides high-power density, short charge/discharge time, and long cycle life, but low energy density. Therefore, a capacitor is often used as an instantaneous power booster.

A capacitor typically includes a dielectric material sandwiched between two conductive electrodes. In order to maximize the capacitance of a capacitor, large surface area of the electrodes, small thickness, and high dielectric constant (permittivity) of the dielectric are required. However, high dielectric constant is generally more desired than other factors due to electrical characteristics, such as breakdown voltage and manufacturability of capacitors. Therefore, magnetic supercapacitors have been designed and experimentally tested for permittivity, which is significantly increased with applied magnetic field through magnetocapacitance (magnetodieletric) (MC) effect. See, e.g., U.S. Patent Pub. No. 2010/0302703, U.S. Patent Pub. No. 2011/0051313, and U.S. Patent Pub. No. 2009/0257168.

U.S. Pat. No. 4,312,025 discloses a magnetic variable capacitor having a capacitance that is tuned by mechanically moving a magnetic plate with magnetic-field generating coils. Since the magnetic electrodes are mechanically movable to tune capacitance by changing the distance between the electrodes, there are performance reliability issues. On the other hand, U.S. Pat. No. 6,737,930 discloses an electric tunable capacitor that uses ferroelectric material to change its dielectric constant by applying variable direct current (DC) voltage to the ferroelectric material. However, the capacitance of the electric tunable capacitor tends to decrease because the dielectric constant decreases with applied DC voltage, likely limiting the capacitor to high energy storage applications.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to reconfigurable and/or non-reconfigurable magnetic supercapacitors, where the dielectric constant is affected by an internal and/or external magnetic field. In one exemplary embodiment, a magnetic supercapacitor comprises dielectric and magnetic layers, which can be a soft magnet, hard magnet, and/or soft and hard magnet composite (i.e., a magnetic exchange-coupled magnet). A magnetic field generated by the magnetic layers can increase the dielectric constant by a factor in a range from about 100 to $1 \times 10^6$, though other increases are possible in other embodiments.

Magnetic field enhanced capacitance can be expressed according to the equation $C = \epsilon_0 \epsilon_r \epsilon_{MC} A/d$, where A is electrode area, $\epsilon_0$ is permittivity of free space, $\epsilon_r$ is relative permittivity, $\epsilon_{MC}$ is coefficient due to magnetocapacitance effect, and d is a distance between the capacitor's electrodes. Therefore, the permittivity and, hence, capacitance changes with applied magnetic field.

In one exemplary embodiment, a conductive segment (e.g., a conductive trace) passes near the capacitor, and current passing through such segment causes the magnetic layers to generate a reconfigurable magnetic field, which is applied to the dielectric to enhance and change the dielectric constant. Since the capacitance can be changed by controlling the current without mechanically moving components, various reliability shortcomings plaguing various conventional capacitors are avoided, and the magnetic supercapacitors disclosed herein also do not suffer the negative capacitance effect plaguing electrically-tunable capacitors.

There are various applications in which a magnetic supercapacitor may be used. As an example, a magnetic supercapacitor may be used as an energy storage device wherein there is a colossal dielectric constant induced by the magnetic field. La—Sr—Ni—O (LSNO: $La_{2-x}Sr_xNiO_4$ at x=0.125) dielectric possesses a positive magnetocapacitance (or magnetodielectric) effect at room temperature up to about 50 Mega-Hertz (MHz). The real part of the permittivity increases with applied magnetic field. Though there are a wide variety of uses for reconfigurable magnetic supercapacitors, it is possible that the magnetic supercapacitors disclosed herein may be reconfigurable, such as for example use in an LC circuit, where the magnetic flux is varied.

Figure 1:
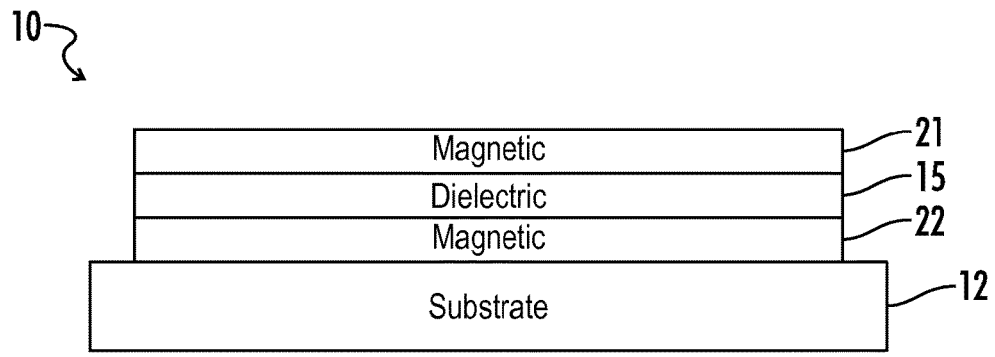
FIG. 1 is a side view illustrating an exemplary embodiment of a magnetic supercapacitor.
Figure 2:
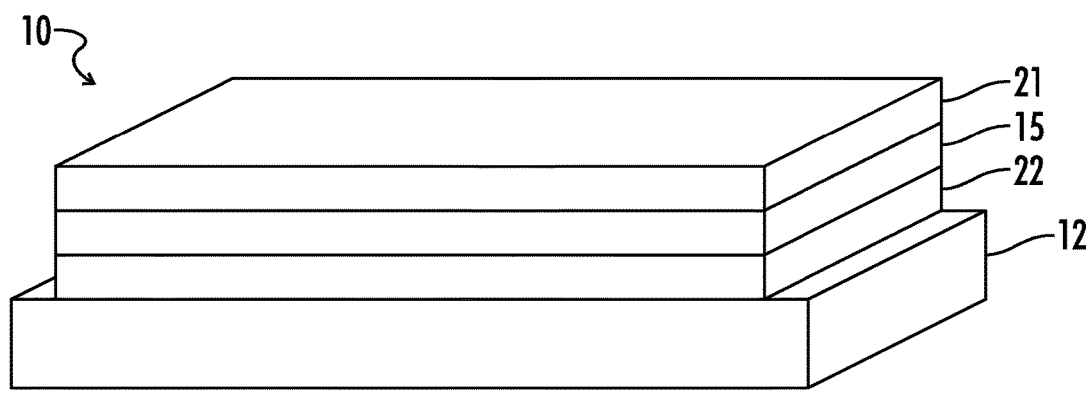
FIG. 2 is a perspective view illustrating the magnetic supercapacitor depicted in FIG. 1.
Figure 3:
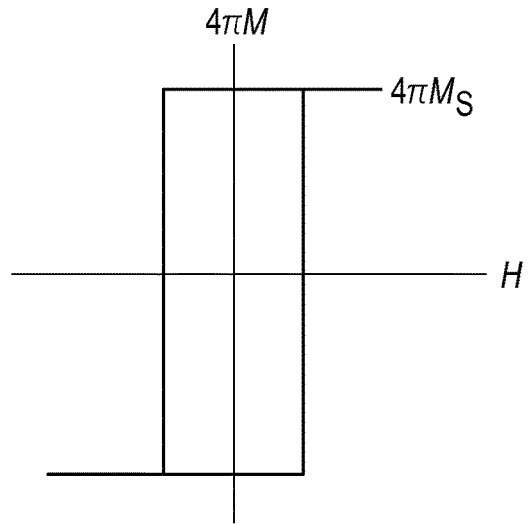
FIG. 3 is a graph illustrating an exemplary magnetic hysteresis loop for a hard magnet.

FIGS. 1 and 2 depict an exemplary embodiment of a magnetic supercapacitor 10 that is formed on a substrate 12. The supercapacitor 10 has a dielectric layer 15 that is formed between two magnetic layers 21 and 22. In one exemplary embodiment, each magnetic layer 21 and 22 is conductive and comprises a hard magnetic material. Various types of dielectric materials may be used for the layer 15, such as La—Sr—Ni—O (LSNO: $La_{2-x}Sr_xNiO_4$ at x=0.125), $Li_{0.05}Ti_{0.02}Ni_{0.93}$ (LTNO), $Sr_{2-x}Ba_xZn_2Fe_{12}O_{22}$ (Y-hexaferrite), $Sr_3Co_2Fe_{24}O_{41}$, $CaCu_3Ti_4O_{12}$ (CCTO), $BaTiO_3$ (BTO), and $Pb(Zr, Ti)O_3$ (PZT). When electric voltage is applied to the magnetic layers 21 and 22, thereby creating a voltage difference between the layer 21 and the layer 22, the supercapacitor 10 stores energy that is later discharged when the voltage differential is removed or reduced. In such embodiment, the magnetic layers 21 and 22 form the capacitor's electrodes, and the supercapacitor 10 achieves a colossal permittivity where the capacitance is characterized by the equation $C=\epsilon_0\epsilon_r\epsilon_{MC}A/d$. FIG. 3 shows an exemplary magnetic hysteresis loop for hard magnetic material, which is used for the embodiment depicted by FIGS. 1 and 2.

Figure 4:
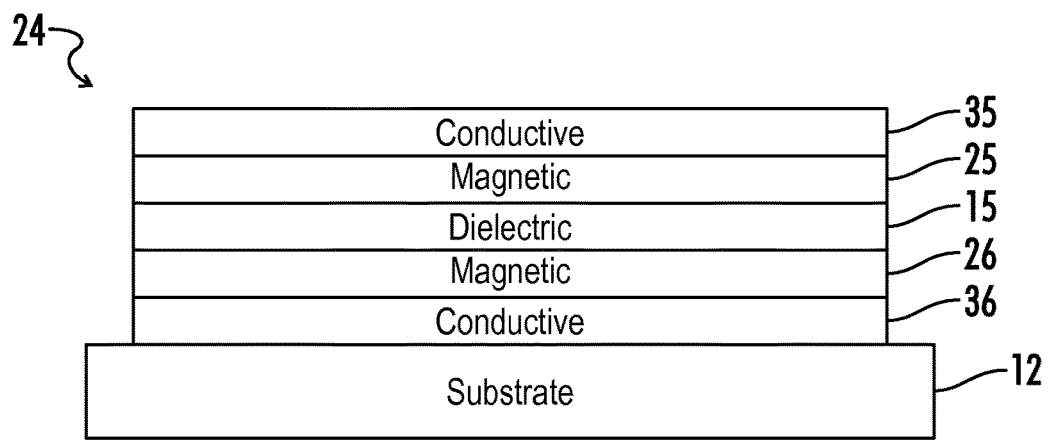
FIG. 4 is a side view illustrating an exemplary embodiment of a magnetic supercapacitor.

If desired, either or both of the magnetic layers 21 and 22 may be non-conductive. If either of the layers 21 or 22 is non-conductive, then a conductive layer is preferably added to function as an electrode for the supercapacitor 10. FIG. 4 shows an exemplary embodiment of a magnetic supercapacitor 24 having magnetic layers 25 and 26 that are non-conductive. The magnetic layers 25 and 26 comprise hard magnetic material. The supercapacitor 24 also has a conductive layer 35 formed on the magnetic layer 24 and a conductive layer 36 formed between the magnetic layer 26 and the substrate 12. The conductive layers 35 and 36 function as the capacitor's electrodes such that the supercapacitor 24 stores energy when electric voltage is applied to the conductive layers 35 and 36, thereby creating a voltage difference between the layers 35 and 36.

Figure 5:
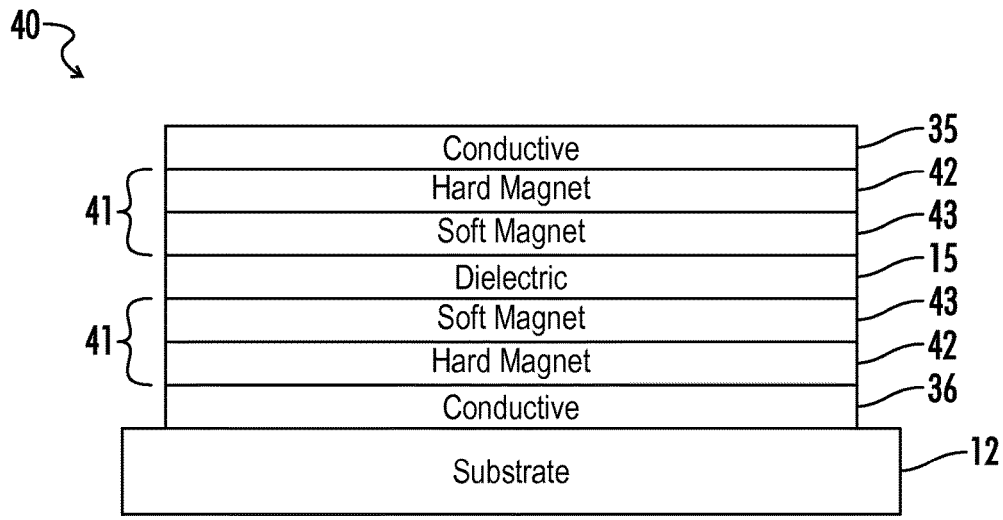
FIG. 5 is a side view illustrating an exemplary embodiment of a magnetic supercapacitor comprising a magnetic exchange coupled magnet (soft and hard magnet composite).
Figure 6:
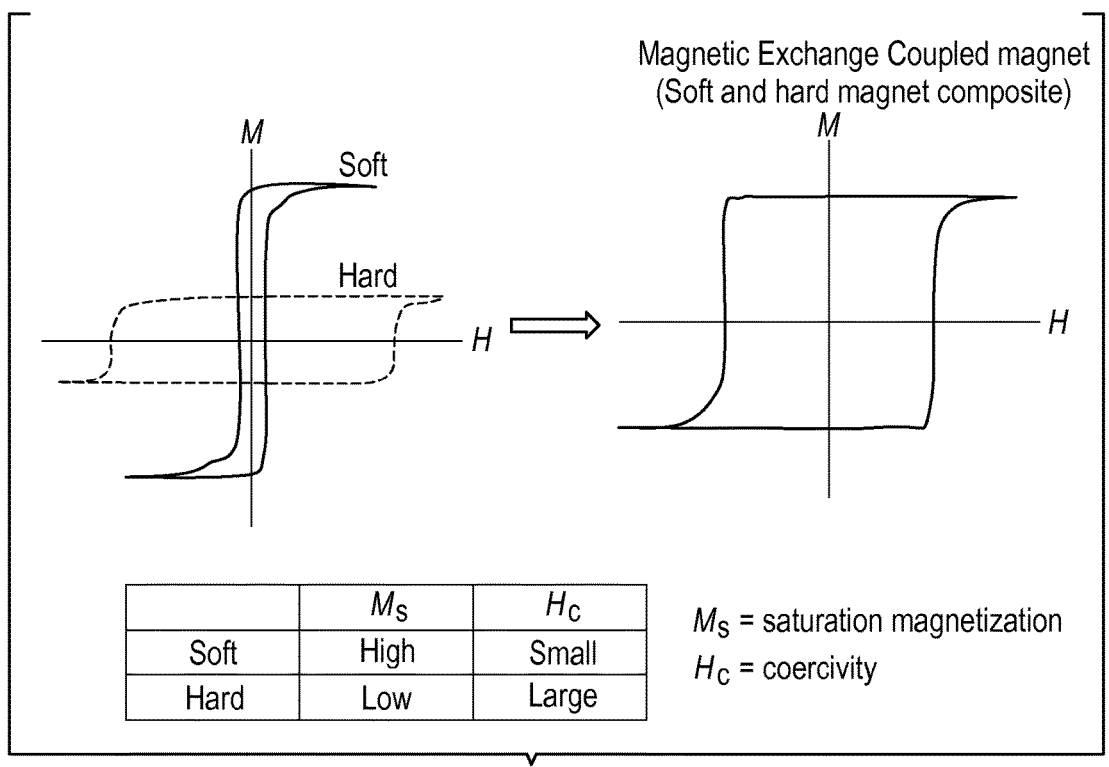
FIG. 6 is a graph illustrating an exemplary magnetic hysteresis loop for a magnetic exchange coupled magnet (soft and hard magnet composite).

FIG. 5 shows an exemplary embodiment of a supercapacitor 40 that is similar to the embodiment shown by FIG. 4 except that it has a dielectric layer 15 sandwiched between magnetic exchange-coupled magnets 41 instead of hard magnets. Each magnetic exchange-coupled magnet is a composite of a hard magnet 42 (e.g., a magnetic layer composed of hard magnetic material) and a soft magnet 43 (e.g., a magnetic layer composed of soft magnetic material). The magnetic exchange-coupled magnets 41 provide enhanced magnetic flux. FIG. 6 shows an exemplary magnetic hysteresis loop for a magnetic exchange-coupled magnet 41.

Figure 7:
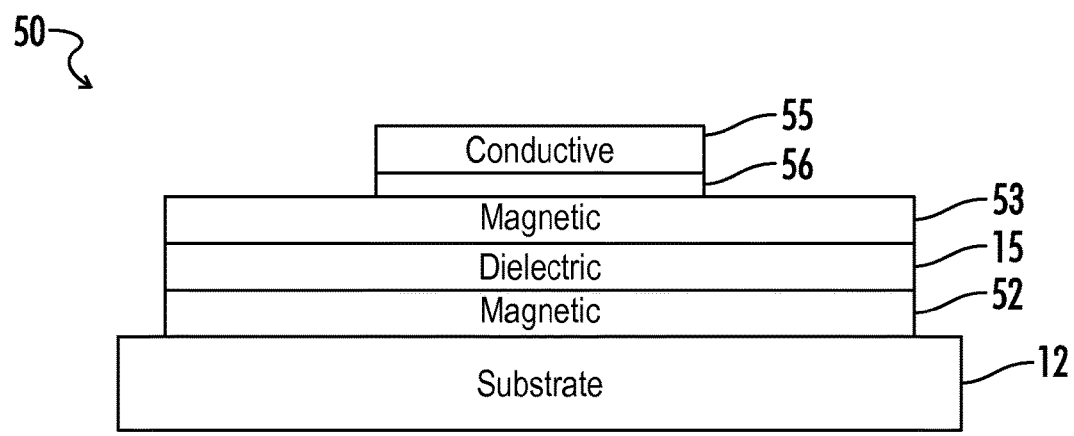
FIG. 7 is a side view illustrating an exemplary embodiment of a reconfigurable magnetic supercapacitor.
Figure 8:
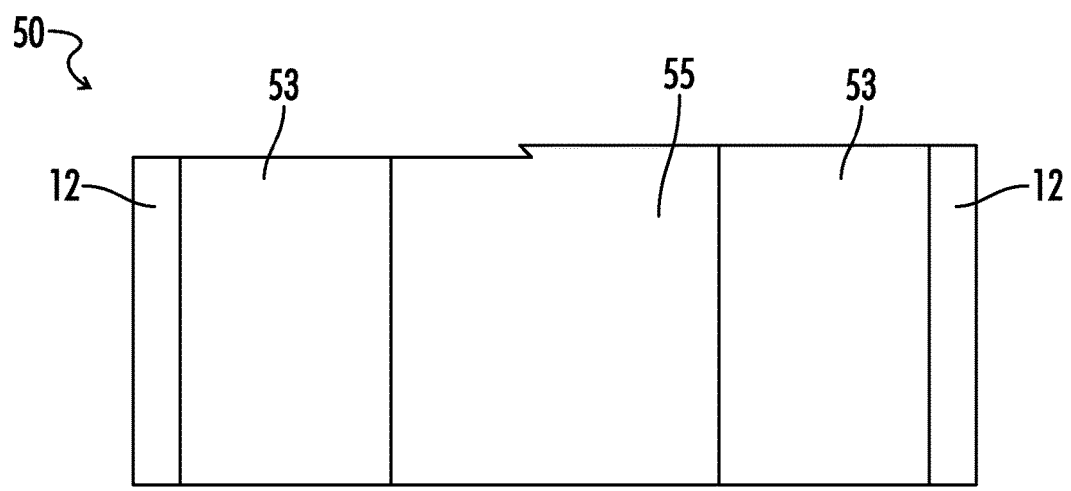
FIG. 8 is a top view illustrating the reconfigurable magnetic supercapacitor depicted by FIG. 7.

Note that in either of the embodiments shown by FIGS. 1 and 4, the magnetic layers may be composed of soft magnetic material rather than hard magnetic material. In the case of layers of a soft magnet, the capacitance can be varied as may be desired. That is, the supercapacitor is reconfigurable to achieve various capacitances. As an example, FIGS. 7 and 8 depict an exemplary embodiment of a reconfigurable supercapacitor 50 that is similar to the embodiment depicted by FIG. 1 except as otherwise described herein. Similar to the embodiment of FIG. 1, the supercapacitor 50 of FIG. 7 has a dielectric layer 15 sandwiched by magnetic layers 52 and 53. However, each of the magnetic layers 52 and 53 forms a soft magnet rather than a hard magnet or a magnetic exchange-coupled magnet, as are the cases for the supercapacitor 10 of FIG. 1 and for the supercapacitor 40 of FIG. 5, respectively. Each of the magnetic layers 52 and 53 is conductive such that the layers 52 and 53 form the capacitor's electrodes. In this regard, when electric voltage is applied to the magnetic layers 52 and 53, thereby creating a voltage difference between the layer 52 and the layer 53, the supercapacitor 50 stores energy that is later discharged when the voltage differential is removed or reduced.

Figure 9:
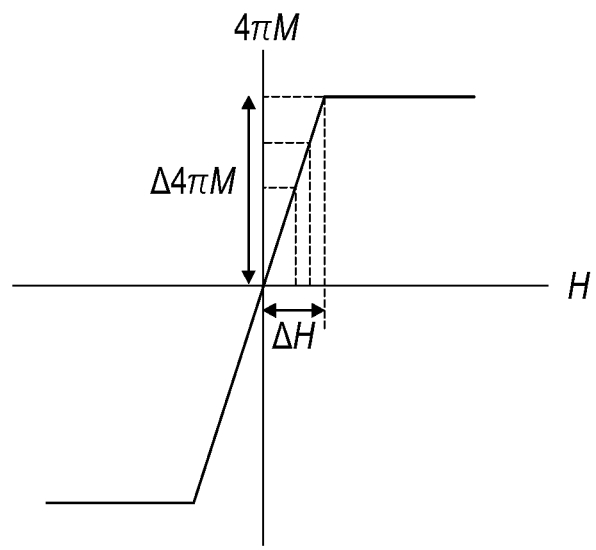
FIG. 9 is a graph illustrating an exemplary magnetic hysteresis loop for a soft magnet.

As shown by FIGS. 7 and 8, the supercapacitor 50 has a conductive trace 55 for controlling the magnetic flux generated by the magnetic layers 52 and 53 and, hence, the capacitance of the supercapacitor 50. The conductive trace 55 is separated from the magnetic layer 53 by an insulating layer 56. The magnetic flux generated by the magnetic layers 52 and 53 is controlled by electrical current flowing through the trace 55. That is, the trace 55 is in close proximity to the magnetic layers 52 and 53 such that the layers 52 and 53 are within the magnetic field generated by the current flowing through the trace 55. Thus, increasing the current flowing through the trace 55 generally increases the magnetic field (H) induced by the current and, therefore, the magnetic flux (4 πM) generated by the layers 52 and 53, and decreasing the current flowing through the trace 55 generally decreases the magnetic flux generated by the layers 52 and 53. FIG. 9 depicts an exemplary magnetic hysteresis loop for the embodiment depicted by FIG. 7. Accordingly, the magnetic flux generated by the magnetic layers 52 and 53 and, hence, the capacitance of the supercapacitor 50 can be tuned by the current applied to the trace 55, as will be described in more detail below.

Figure 10:
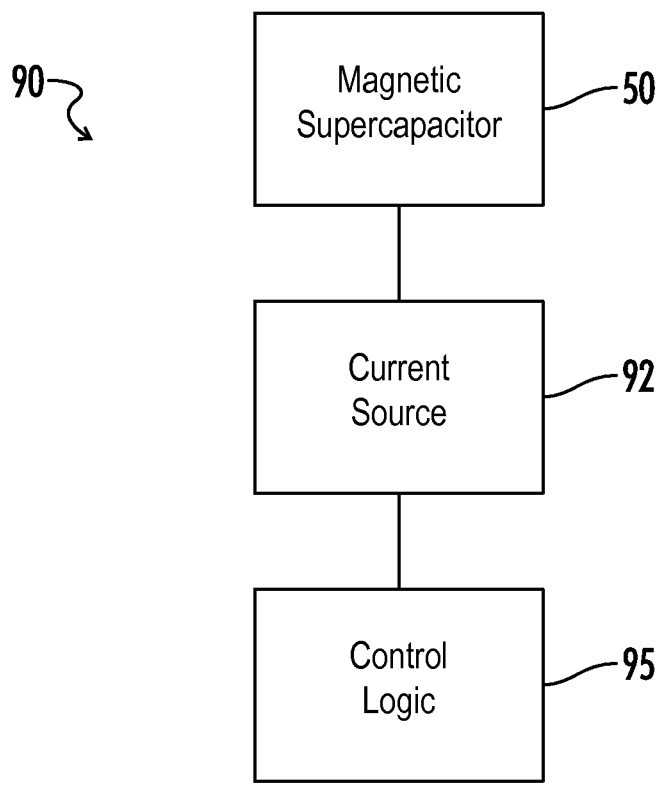
FIG. 10 is a block diagram illustrating an exemplary embodiment of a system for tuning a capacitance of a magnetic supercapacitor, such as is depicted by FIG. 7.

FIG. 10 depicts an exemplary embodiment of a system 90 for tuning a capacitance of a magnetic supercapacitor 50. The system 90 comprises a current source 92 that is conductively coupled to the trace 55 (FIG. 7) of the supercapacitor 50. Further, control logic 95 is coupled to the current source 92 for controlling the amount of current applied by the current source 92 to the trace 55. The control logic 95 may be implemented in hardware, software, firmware, or any combination thereof. To increase the capacitance of the supercapacitor 50, the control logic 95 provides a control signal causing the current source 92 to increase the current flowing through the trace 55, thereby increasing the magnetic field induced by such current. Thus, the magnetic flux of the magnetic layers 52 and 53 (FIG. 7) positioned within such magnetic field increases, thereby increasing the permittivity of the dielectric layer 15 and, hence, the capacitance of the supercapacitor 50. Conversely, to decrease the capacitance of the supercapacitor 50, the control logic 95 provides a control signal causing the current source 92 to decrease the current flowing through the trace 55, thereby decreasing the magnetic field induced by such current. Thus, the magnetic flux of the magnetic layers 52 and 53 (FIG. 7) positioned within such magnetic field decreases, thereby decreasing the permittivity of the dielectric layer 15 and, hence, the capacitance of the supercapacitor 50.

Figure 11:
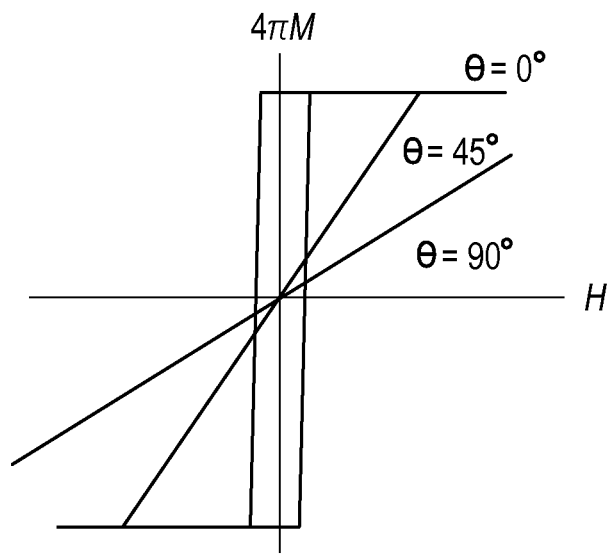
FIG. 11 is a graph illustrating an exemplary angular dependence of magnetization for magnetic materials.

In case of high anisotropy magnetic layer 52 or 53, the magnetic flux is tuned with the angle of applied magnetic field with respect to the easy axis of the magnetic layer. Therefore, angular dependence of the magnetic flux generated by the magnetic layer is shown by FIG. 11. This magnetic flux change tunes capacitance. Also, the energy stored by a capacitor increases with increasing capacitance according to the equation $E=\frac{1}{2} CV^2$, where E is the stored energy, C is the capacitance of the supercapacitor, and V is the voltage between the capacitor's electrodes.

Figure 12:
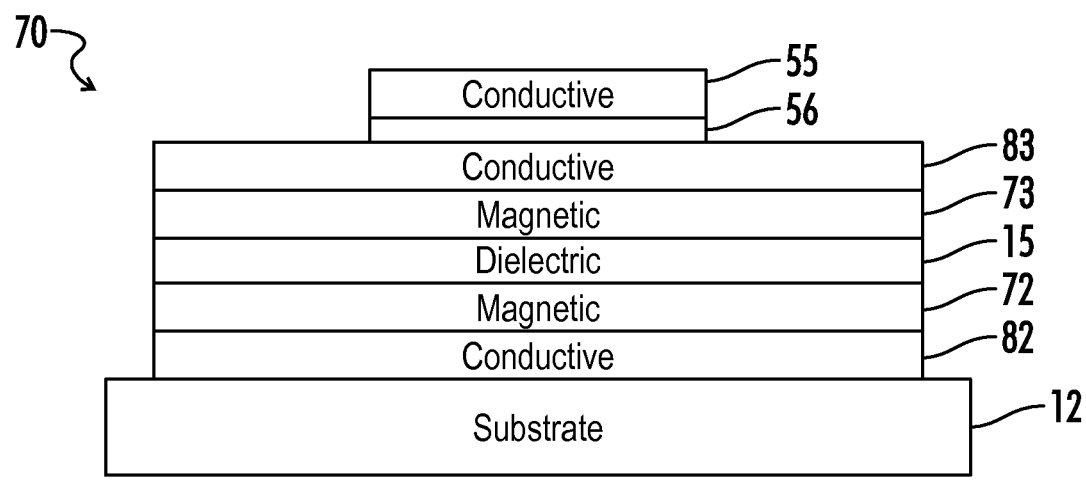
FIG. 12 is a side view illustrating an exemplary embodiment of a reconfigurable magnetic supercapacitor.

Note that it is possible for the magnetic layers 52 and 53 to be non-conductive. In such case conductive layers (not shown in FIG. 7) may be added, similar to the embodiment shown by FIG. 4. In this regard, FIG. 12 shows a supercapacitor 70 having a dielectric layer 15 sandwiched between magnetic layers 72 and 73, which are non-conductive and comprise soft magnetic material. A conductive layer 83 is formed on the magnetic layer 73, and a conductive layer 82 is formed between the magnetic layer 72 and a substrate 12. Further, an insulating layer 56 and conductive trace 55 are formed on the conductive layer 83. The operation of the supercapacitor 70 may be the same as the supercapacitor 50 of FIG. 7, except that the layers 82 and 83, instead of the layers 72 and 73, form the capacitor's electrodes.

Figure 13:
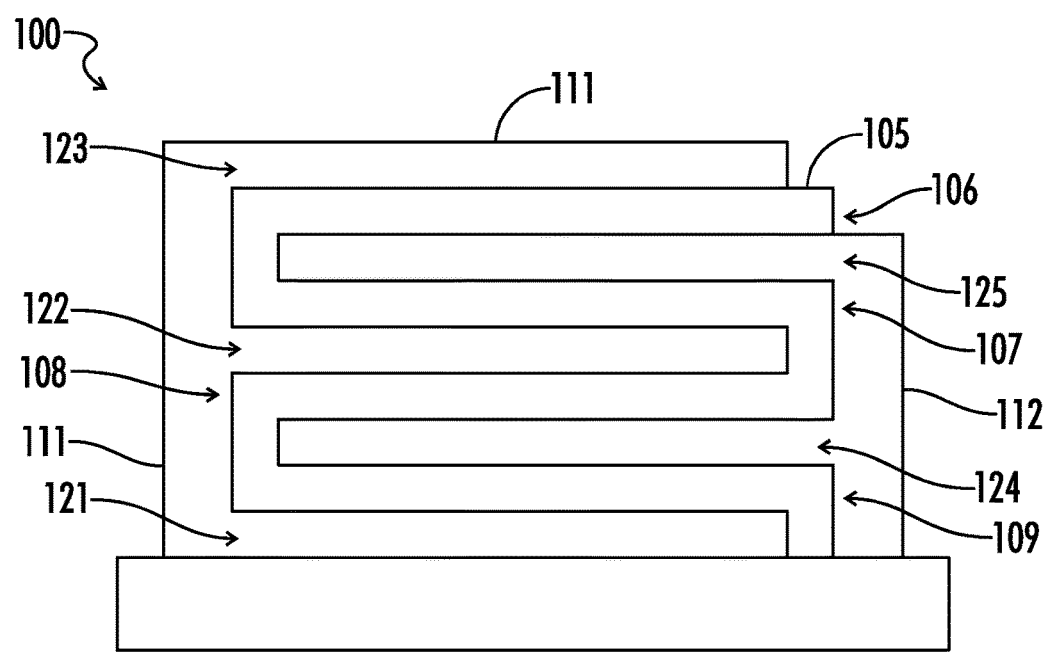
FIG. 13 is a side view illustrating an exemplary embodiment of a multilayer magnetic supercapacitor.

In order to increase capacitance and, hence, energy density, magnetic layers may be added. FIG. 13 shows an exemplary embodiment of a multilayer magnetic supercapacitor 100. The term "multilayer" refers to multiple dielectric layers sandwiched between magnetic layers. As shown by FIG. 13, the supercapacitor 100 has a meandering dielectric segment 105 having multiple turns in which each turn essentially provides a dielectric layer that is sandwiched between magnetic materials. The dielectric segment 105 of the exemplary embodiment shown by FIG. 13 has four turns providing four dielectric layers 106-109, but other number of turns and dielectric layers are possible in other embodiments. In other embodiments, separate dielectric layers may be used instead of a single segment forming multiple layers.

The supercapacitor 100 also has a magnetic segment 111 and a magnetic segment 112. Each segment 111 and 112 fills in space between the dielectric segment 105, thereby forming layers of magnetic material for sandwiching the dielectric layers 106-109. In this regard, the segment 111 forms magnetic layers 121-123, and the segment 112 forms magnetic layers 124 and 125. The dielectric layer 109 is sandwiched between magnetic layers 121 and 124, the dielectric layer 108 is sandwiched between magnetic layers 124 and 122, the dielectric layer 107 is sandwiched between magnetic layers 122 and 125, and the dielectric layer 106 is sandwiched between magnetic layers 125 and 123. An exemplary process of fabricating the supercapacitor 100 is described further in Appendix A submitted herewith. Note that any of the magnetic supercapacitors described herein may be fabricated via conventional microfabrication techniques, though other types of fabrication techniques may be used if desired.

In the embodiment depicted by FIG. 13, the magnetic segments 111 and 112 are conductive and comprise hard magnetic material or magnetic exchange coupled magnet. In such embodiment, the segments 111 and 112 form the capacitor's electrodes. Note that it is possible for the magnetic segments 111 and 112 to be non-conductive. In such case, conductive layers may be added to form the capacitor's electrodes. As an example, a conductive layer (not shown) may be formed on the magnetic segments 111 and 112 such that the dielectric layers 106-109 are sandwiched between the conductive layers. In addition, it is possible for the magnetic segments 111 and 112 to comprise soft magnetic material. In such case, electrical current may be applied in close proximity to the magnetic segments 111 and 112 in order to control the magnetic flux generated by these layers and, hence, the capacitance of the supercapacitor 100. As an example, a conductive trace may be formed on the layer 123 or otherwise in close proximity to the magnetic segments 111 and 112, similar to the embodiment described above with reference to FIG. 7.

Figure 14:
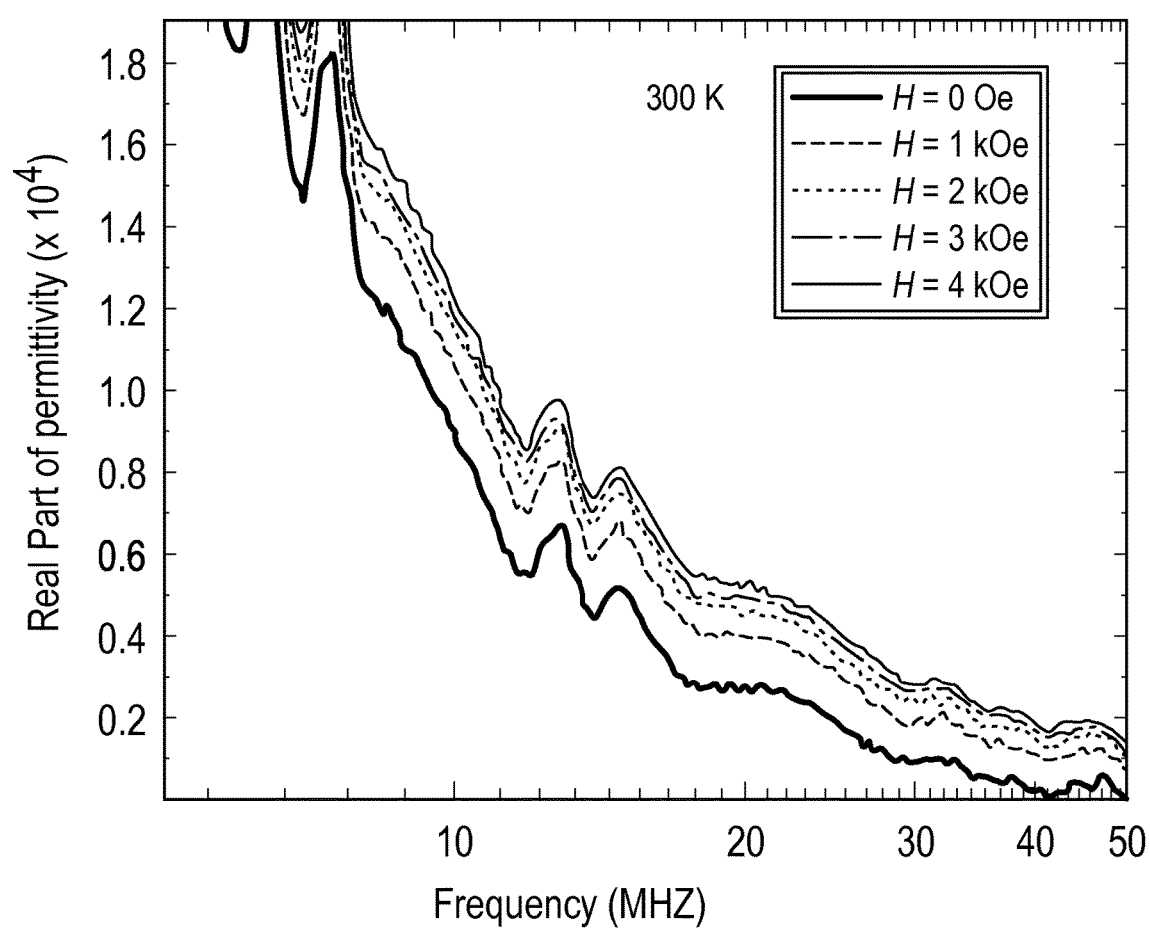
FIG. 14 is a graph illustrating measured real part of permittivity as a function of frequency at various applied magnetic fields for an exemplary experiment.
Figures 15, 16:
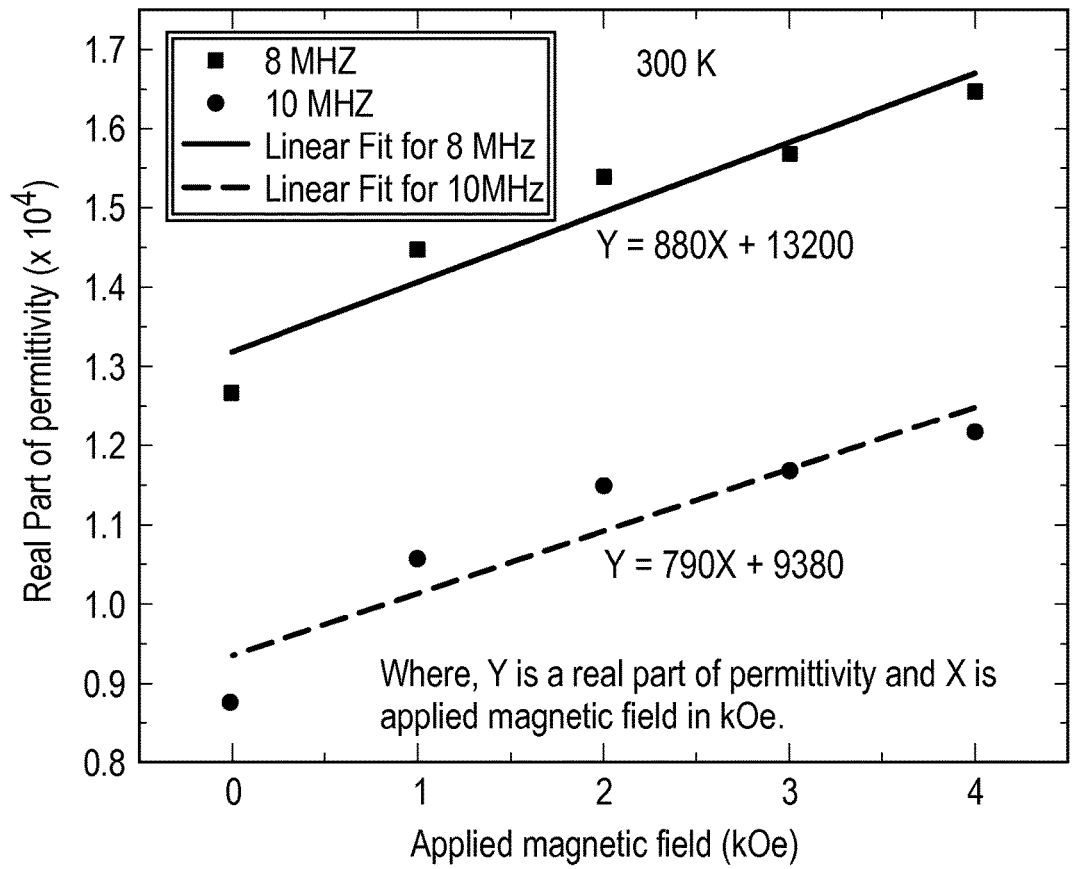
FIG. 15 is a graph illustrating measured real part of permittivity as a function of applied magnetic field at frequencies of 8 MHz and 10 MHz for an exemplary experiment.
FIG. 16 is a table illustrating measured real part of permittivity with various applied magnetic fields at frequencies of 8 MHz and 10 MHz for an exemplary experiment.

A preliminary experiment was performed on La—Sr—Ni—O polycrystalline ceramic to observe a positive magnetodielectric (magnetocapacitance) effect. Traditional ceramic process was used to synthesize LSNO powder followed by heat treatment of LSNO green body to form a disk sample. Gold electrodes were deposited on both side of the LSNO ceramic disk. Permittivity was measured under applied magnetic field by an impedance/material analyzer (Agilent E4991A) with a dielectric material test fixture (Agilent 16453A) and electromagnet. Real part of permittivity increased with increasing applied magnetic field from about 0 Oe to about 4 kOe at 300 K, as shown by FIGS. 14 and 15. Magnetocapacitance effect was measured to be about +30% at 8 MHz and about +38% at 10 MHz, respectively. Magnetic field dependence of the permittivity is summarized in FIG. 16. These results suggest that LSNO can be used for a reconfigurable and/or non-reconfigurable magnetic supercapacitor. Furthermore, colossal magnetocapacitance and much higher permittivity are expected by optimization of processing and material synthesis.

The invention claimed is:

1. A magnetic supercapacitor, comprising:
   a first magnetic layer, wherein the first magnetic layer comprises soft magnetic material;
   a second magnetic layer;
   a dielectric layer positioned between the first and second magnetic layers; and
   a conductive segment positioned in close proximity to the first magnetic layer such that the first magnetic layer is positioned within a magnetic field induced by a current flowing through the conductive segment, wherein a capacitance of the magnetic supercapacitor is controlled by the current in the conductive segment.

2. The magnetic supercapacitor of claim 1, wherein the first magnetic layer is conductive.

3. The magnetic supercapacitor of claim 1, wherein the first magnetic layer is non-conductive, wherein the magnetic supercapacitor further comprises a conductive layer, and wherein the first magnetic layer is positioned between the conductive layer and the dielectric layer.

4. The magnetic supercapacitor of claim 1, wherein the second magnetic layer comprises soft magnetic material.

5. The magnetic supercapacitor of claim 4, wherein a magnetic flux of the second magnetic layer is controlled by the current flowing through the conductive segment.

6. The magnetic supercapacitor of claim 1, wherein the first magnetic layer comprises high uniaxial anisotropy magnetic material.

7. The magnetic supercapacitor of claim 1, wherein the dielectric layer has a negative magnetocapacitance.

8. The magnetic supercapacitor of claim 1, wherein the dielectric layer has a positive magnetocapacitance.

9. The magnetic supercapacitor of claim 8, wherein the dielectric layer comprises at least one of a group including: $La_{1.875}Sr_{0.125}NiO_4$ and $Sr_{2-x}Ba_xZn_2Fe_{12}O_{22}$ ($x=0.3\sim0.7$).

10. The magnetic supercapacitor of claim 1, wherein a magnetic flux of the first magnetic layer is controlled by the current flowing through the conductive segment.

11. The magnetic supercapacitor of claim 1, further comprising an insulating layer positioned between the conductive segment and the first magnetic layer.

12. The magnetic supercapacitor of claim 1, further comprising control logic configured to control the current flowing through the conductive segment.

13. The magnetic supercapacitor of claim 12, further comprising a current source coupled to the conductive segment to provide current to the conductive segment, wherein the control logic is configured to provide a signal to the current source to control the current flowing through the conductive segment.

14. The magnetic supercapacitor of claim 13, wherein the control logic is configured to provide a first signal to the current source to increase the current in the conductive segment and thereby increase the capacitance of the magnetic supercapacitor.

15. The magnetic supercapacitor of claim 14, wherein the control logic is configured to provide a second signal to the current source to decrease the current in the conductive segment and thereby decrease the capacitance of the magnetic supercapacitor.

16. The magnetic supercapacitor of claim 1, wherein the dielectric layer comprises at least one of a group including: $La_{1.875}Sr_{0.125}NiO_4$, $Li_{0.05}Ti_{0.02}Ni_{0.93}O$, $Sr_{2-x}Ba_xZn_2Fe_{12}O_{22}$ (x=0.3~0.7), $Sr_3Co_2Fe_{24}O_{41}$, $CaCu_3Ti_4O_{12}$, $BaTiO_3$, and $Pb(Zr,Ti)O_3$.

\* \* \* \* \*